US012781402B2

(12) United States Patent
Herrmann

(10) Patent No.: US 12,781,402 B2
(45) Date of Patent: Nov. 3, 2026

(54) ACOUSTICALLY EFFECTIVE AND DIMENSIONALLY STABLE MOLDED PART

(71) Applicant: Sandler AG, Schwarzenbach (DE)

(72) Inventor: Stefan Herrmann, Doehlau (DE)

(73) Assignee: Sandler AG, Schwarzenbach (DE)

( * ) Notice: Subject to any disclaimer, the term of this patent is extended or adjusted under 35 U.S.C. 154(b) by 574 days.

(21) Appl. No.: 18/066,450

(22) Filed: Dec. 15, 2022

(65) Prior Publication Data

US 2023/0191720 A1 Jun. 22, 2023

(30) Foreign Application Priority Data

Dec. 17, 2021 (DE) ..................... 10 2021 133 730.5

(51) Int. Cl.
*D04H 1/54* (2012.01)
*B29C 70/08* (2006.01)
(Continued)

(52) U.S. Cl.
CPC ............. *D04H 1/54* (2013.01); *B29C 70/081* (2013.01); *B29C 70/42* (2013.01); *B32B 5/266* (2021.05);
(Continued)

(58) Field of Classification Search
CPC . D04H 1/46; D04H 1/485; D04H 5/06; B29C 70/081; B29C 70/42; B29K 2067/003; B29K 2267/003; B29K 2995/0002; B29K 2995/0069; B29K 2995/0082; B29L 2031/3005; D10B 2331/04; D10B 2401/02; D10B 2401/062; D10B 2505/12; B32B 2250/20;
(Continued)

(56) References Cited

U.S. PATENT DOCUMENTS 6,471,910 B1 * 10/2002 Haggard ................ D04H 3/018
425/72.2
2004/0053003 A1 * 3/2004 Coates ..................... D04H 1/58
428/98
(Continued)

FOREIGN PATENT DOCUMENTS

AU 2010233029 C1 7/2012
CN 103422254 A 12/2013
(Continued)

OTHER PUBLICATIONS

Complete Textile Glossary, Celanese Acetate LLC, 2001.*

*Primary Examiner* — Jennifer A Gillett
(74) *Attorney, Agent, or Firm* — Fox Rothschild LLP

(57) ABSTRACT

Acoustically effective molded part which is dimensionally stable after pressure and heat treatment, consisting of a mechanically solidified staple fiber nonwoven fabric formed from fibers, namely from matrix fibers, bicomponent hot-melt adhesive fibers and thermoplastic adhesive fibers, as well as comprising an outer layer and a middle layer, wherein flattenings formed by adhesive fibers are located on the outer layers of the molded part, there are no flattenings in the middle layer of the molded part, the outer layer has a flattening degree according to the test method mentioned in the description of 25% to 75%, the outer layer has a
(Continued)

(1)

thickness of 15 μm to 40 μm and the molded part has a specific flow resistance in the range from 1000 to 3000 Pa s/m.

4 Claims, 8 Drawing Sheets

(51) Int. Cl.

| | |
|---|---|
| ***B29C 70/42*** | (2006.01) |
| ***B32B 5/26*** | (2006.01) |
| ***B60R 13/08*** | (2006.01) |
| ***G10K 11/162*** | (2006.01) |
| *B29K 67/00* | (2006.01) |
| *B29K 267/00* | (2006.01) |
| *B29L 31/30* | (2006.01) |

(52) U.S. Cl.

CPC ........ *B60R 13/08* (2013.01); *B29K 2067/003* (2013.01); *B29K 2267/003* (2013.01); *B29K 2995/0002* (2013.01); *B29L 2031/3005* (2013.01); *B32B 2250/20* (2013.01); *B32B 2307/102* (2013.01); *D10B 2331/04* (2013.01); *D10B 2401/062* (2013.01); *D10B 2505/12* (2013.01); *G10K 11/162* (2013.01)

(58) Field of Classification Search

CPC ... B32B 3/28; B32B 5/266; B32B 2262/0284; B32B 2262/144; B32B 2307/102; B32B 2307/7376; B32B 5/022; B60R 13/08; G10K 11/162

See application file for complete search history.

(56) References Cited

U.S. PATENT DOCUMENTS

| | | | | |
|---|---|---|---|---|
| 2005/0090168 | A1* | 4/2005 | Fay | D04H 1/46 442/85 |
| 2009/0085378 | A1* | 4/2009 | Borchardt | B32B 5/06 296/191 |
| 2010/0081354 | A1* | 4/2010 | Shipley | D04H 1/485 442/407 |
| 2016/0222561 | A1 | 8/2016 | Coates et al. | |
| 2018/0044828 | A1 | 2/2018 | Inokuma et al. | |

FOREIGN PATENT DOCUMENTS

| | | | |
|---|---|---|---|
| DE | 102005035014 | B3 | 9/2006 |
| EP | 0476538 | A1 | 3/1992 |
| EP | 0484778 | A2 | 5/1992 |
| EP | 2425965 | B1 | 10/2018 |
| JP | 6965405 | B1 | 11/2021 |

* cited by examiner

ACOUSTICALLY EFFECTIVE AND DIMENSIONALLY STABLE MOLDED PART

CROSS-REFERENCE TO RELATED APPLICATIONS

The present application claims priority to and the benefit of German Patent Application Serial No. 10 2021 133 730.5 which was filed on Dec. 17, 2021. The content of which is incorporated herein in its entirety.

BACKGROUND

Sound attenuation for comfort enhancement in automotive applications has produced a variety of solutions in the past.

SUMMARY

In this context, the sound attenuation in a porous structure depends on the acoustic impedance or the specific flow resistance. The acoustic impedance describes the resistance to sound propagation in the porous structure. It can be calculated as the quotient of sound pressure and sound flow. The acoustic impedance of a porous structure can also be described by the specific flow resistance.

This depends on the internal surface of the structure and the size and number of pores.

A high internal surface area favors the frictional losses (dissipation) of the sound wave flowing through. A high flow resistance is important for a good sound absorption capacity of the porous structure.

However, if the flow resistivity is too high and the structure is too dense, the sound wave cannot penetrate the structure and effects of reflection occur, and sound absorption is significantly reduced.

If, on the other hand, the flow resistance is too low, the viscous friction losses and thus the dissipative conversion of the mechanical energy into thermal energy are too low. Low damping effects and thus low sound absorption can also be expected in this case.

The specific flow resistance must lie within an optimum range.

Various empirical values are given to this effect in the literature. The specific flow resistance should be in a range between 1,000-3,000 Pa s/m.

Especially in the case of sound attenuation by textile sheet materials, various solutions have been attempted to increase the inner surface area of the porous structure in order to achieve attenuation of sound waves over the entire critical frequency spectrum from 500 Hz to 6300 Hz.

In addition to sound absorption, other physical factors must be taken into account in determining the suitability of a molded part. In addition to dimensional stability, exterior applications such as wheel arch liners or underbody mats also require resistance to stone impact or impermeability to water.

The prior art offers various approaches to solving this problem.

EP484778 describes the use of fiber-based mats made of nonwovens, which can be used as a base material for the production of molded parts. In addition to the description of a possible manufacturing process, EP484778 has the approach to work uniformly with polymers so that recycling is simplified. To improve the dimensional stability and also liquid-repellent properties, additional layers can be laminated or controlled by designing forming tools such as beads or spacers.

EP476538 elucidates the composition of a fiber-based mat for the production of dimensionally stable molded parts more profoundly. This patent describes the use of fibers with increased amorphous portions as stiffening and adhesive components. Thermal treatment converts amorphous regions of fibers into crystalline regions. After thermal treatment and cooling, the fiber mat forms a stable molded part. According to the description, the aim is to produce a polymer-uniform molded part, which provides stiffening by using fibers with amorphous portions, but these also serve as adhesives for surface lamination.

Both EP484778 and EP476538 do not give any indication about how a targeted acoustic effect can be achieved.

DE102005035014 shows how the acoustic effect of nonwovens can be improved. The acoustic damping effect is improved by introducing many reflection points by means of two-dimensional smoothing on one or both sides. A disadvantage of materials according to DE102005035014 is that the material is processed over the entire surface and that the nonwoven, when used alone as a base material for a molded part, exhibits low formability and resulting lack of rigidity due to the fine fiber mixture with a medium titer of less than 2 dtex.

DETAILED DESCRIPTION

Figure 1:
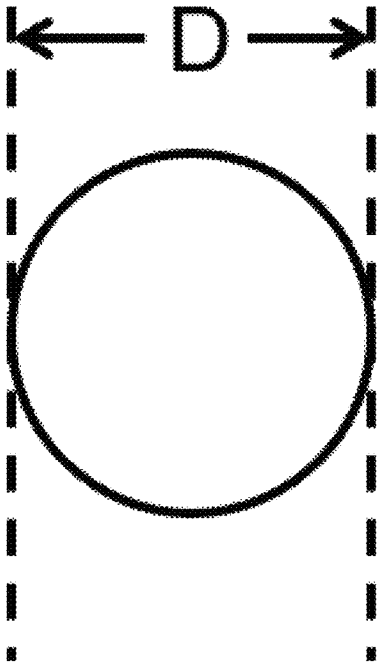
FIG. 1 shows an untreated adhesive fiber, which has a round cross-section with the fiber diameter D.

The invention was therefore based on the problem of providing an acoustically effective molded part which avoids the above-mentioned disadvantages of the prior art and of specifying a structure for a sound-absorbing material which, in addition to dimensional stability, ensures zonally different sound absorption and/or flexural rigidity depending on the requirements.

The problem was solved according to the features of claim 1, preferred configurations are mentioned in sub-claims 2 to 4.

The parameters mentioned in the description are determined according to the following methods:

Medium fiber fineness: calculated according to the method below on the basis of the nominal fiber fineness of the fibers used in the fiber blend and specified in "g/10000 m" (also corresponds to the unit "dtex").

$$\text{Medium fiber fineness (g/10000 m)} = \left(\frac{100}{\left(\frac{A}{T1} + \frac{B}{T2} + \frac{C}{T3}\right)}\right)$$

wherein the following applies:

A, B, C=the percentage of a fiber component in the blend. The sum of A, B and Cis 100.

T1, T2, T3=nominal fiber fineness of the respective fiber component in "g/10000 m".

Medium fiber diameter: is calculated according to the formula below using the medium fiber fineness and the medium density of the polymer of the fibers used in the fiber blend:

$$\text{Medium fiber diameter (m)} = \sqrt{\frac{4 * MF}{419 * D * 10^7}}$$

wherein the following applies:

MF=medium fiber fineness specified in "g/10000 m

D=density of the base polymer of the fiber, specified in "kg/m$^3$".

Mass specific fiber surface area: is calculated according to the formula below based on the fiber blend present in the base material and specified in "m$^2$/g".

$$\text{Specific fiber surface } (m^2/g) = \frac{MFD * 10000 * 3.1419}{MF}$$

wherein the following applies:

MFD=medium fiber diameter

MF=medium fiber fineness.

Weight per unit area: according to DIN EN 29073-1, specified in "g/m$^2$".

Thickness: according to DIN EN ISO 9073-2 at a preload of 0.5 kPa, specified in "mm".

Weight per unit volume: is determined according to the following formula based on the thickness of the test specimen and the weight per unit area measured on the test specimen, specified in "kg/m$^3$".

$$\text{Weight per unit volume } (kg/m^3) = \frac{\text{Weight per unit area } (kg/m^2) * 1000}{\text{Thickness (mm)}}$$

Porosity: is calculated according to the formula below and specified in "%."

$$\text{Porosity (\%)} = \left(1 - \left(\frac{\text{Weight per unit volume of the specimen } (kg/m^3)}{\text{Density of the used fiber material } (kg/m^3)}\right)\right) * 100$$

Specific flow resistance: according to DIN EN 29053 method A. Determination of the flow resistance according to the direct air flow method.

Determination of sound absorption: according to DIN EN ISO 10534-2. Determination of sound absorption coefficient and impedance in impedance pipes. Part 2: Transfer function method A round tube, manufacturer Brüel&Kjaer, with a diameter of 29 mm is used as the impedance tube. The test sample is placed sonically hard directly on the tube opening, this means an air gap of 0 mm.

Absorption is measured in the frequency range from 500 Hz-6,300 Hz.

Flexural rigidity (3-point bending test): is determined in accordance with ISO 178 using UPM from Zwick, Germany. In this process, the following setting is necessary:

Deformation speed (mm/min): 10

Distance of the supports (mm): 64

Width of the test trough (mm): 50

Thickness of the test trough (mm): 10

Radius of the test trough (mm): 5

Width of the specimen (mm): 30

Length of specimen (mm): 120

Position of the test trough: centered between supports

The test is carried out on samples the fiber alignment of the base material of which is aligned in manufacturing direction "MD" or transverse to the manufacturing direction "CD". Usually, such samples are punched.

The test trough is placed centrally between the supports transversely to the length of the test specimen. After the start of the test, the test trough moves at the deformation speed in the direction of the test specimen. When the test fin first makes contact with the test specimen (force/preload=0.1 N), the measurement travel is zeroed and counted again. When the measuring travel of 1 mm, 2 mm, 3 mm, 4 mm and 5 mm is reached, the force applied to the fin is determined and specified in "N".

Within the meaning of the present invention, flexural rigidity is defined as the force applied to the compression fin at 5 mm of deformation travel.

Flattening: the term is defined as the deformation of a fiber surface, wherein part of the fiber surface is planarly pressed, and the width and length of the planar surface is at least 1.3 times greater than the original fiber diameter.

The width is determined in one direction in the plane of a flattening.

A flattening (1) is a planar surface located on the outside of a molded part according to the invention. A flattening (1) according to the invention must have a planar surface, the width and length of which are at least 1.3 times greater than the diameter D of the adhesive fiber used. FIGS. 1 to 4 illustrate this:

FIG. 1 shows an untreated adhesive fiber, which has a round cross-section with the fiber diameter D.

Figure 2:
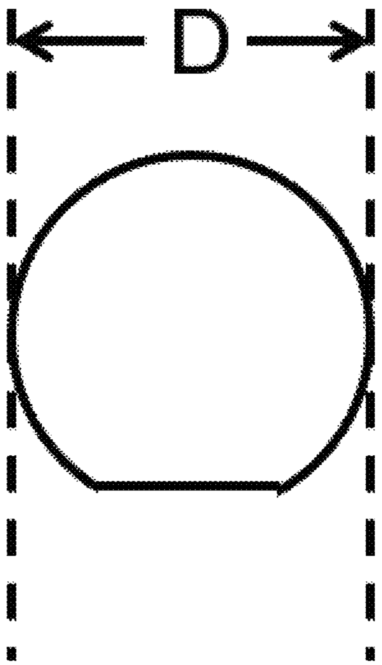
FIG. 2 shows the cross-section of a heat- and pressure-treated adhesive fiber, where only a slight smoothing is visible. The width of the smoothing is below the fiber diameter D.

FIG. 2 shows the cross-section of a heat- and pressure-treated adhesive fiber, where only a slight smoothing is visible. The width of the smoothing is below the fiber diameter D.

Figure 3:
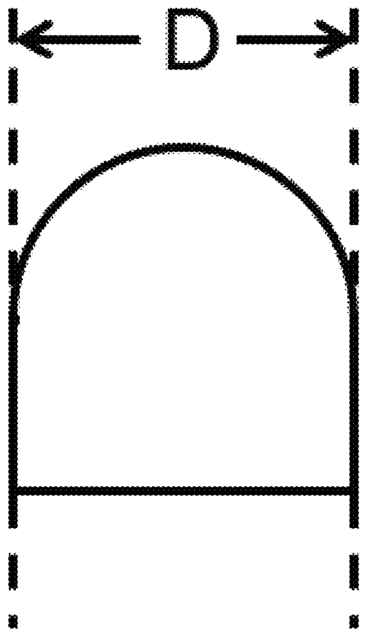
FIG. 3 shows the cross-section of a heat- and pressure-treated adhesive fiber, wherein only a stronger smoothing can be recognized. The width of the smoothing is in the range of the fiber diameter D.

FIG. 3 shows the cross-section of a heat- and pressure-treated adhesive fiber, wherein only a stronger smoothing can be recognized. The width of the smoothing is in the range of the fiber diameter D.

Figure 4:
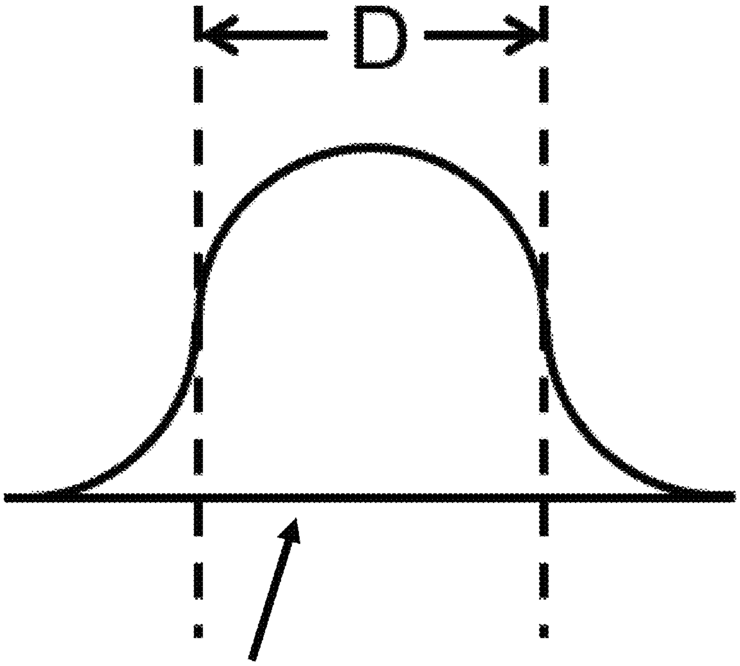
FIG. 4 shows the cross-section of an adhesive fiber treated with heat and pressure in accordance with the invention, wherein the fiber has been pressed in such a way that the flattened surface describes the flattenings (1) according to the invention. The width of a flattening (1) claimed according to the invention is at least 1.3 times the fiber diameter D.

FIG. 4 shows the cross-section of an adhesive fiber treated with heat and pressure in accordance with the invention, wherein the fiber has been pressed in such a way that the flattened surface describes the flattenings (1) according to the invention. The width of a flattening (1) claimed according to the invention is at least 1.3 times the fiber diameter D.

Flattening degree: is determined according to the following method and specified in "%". A scanning electron microscope image is used to determine how many flattened fibers are located in the outer layer of a molded part. The flattened fibers are measured in relation to the area of the surface.

A SEM image of the surface of a molded part, on which the flattenings on the surface are visible, e.g., FIG. 4 with many flattenings, is printed borderless on standard copy paper (80 g/m$^2$). The entire image area is weighed and specified as "weight 1" in "g". The flattened areas are cut out using a scalpel, type Wedo 78621, weighed and specified as "weight 2" in "g". The degree of flattening is then calculated as follows:

$$\text{Flattening degree (\%)} = \left(1 - \left(\frac{\text{Weight 1} - \text{Weight 2}}{\text{Weight 1}}\right)\right) * 100$$

Pressing degree: Ratio of the thickness of the molded part before deformation and the thickness of the molded part after pressing operation.

Pressing degree in % is determined as follows:

$$\text{Pressing degree} = \left(\frac{\text{Thickness molded blank} - \text{Thickness molded part}}{\text{Thickness molded blank}}\right) * 100$$

The fiber types described are defined as follows:

The term matrix fibers refers to normal staple fibers made of synthetic, thermoplastic polymers the filaments of which have been stretched and have a high proportion of crystalline regions. These fibers have a fiber fineness of between 0.9 to 4.4 dtex, wherein a fiber titer range of 1.3-3.3 dtex is preferred and quite preferably a range of 1.7-2.2 dtex is used to ensure the acoustic effect. When heated during the manufacture of a molded part, these fibers retain their shape and do not exhibit adhesive properties. They do not melt until the melting point of the base polymer is reached, e.g. polyethylene terephthalate at 256° C. Crystallinity is achieved in fiber production by stretching the filaments during the spinning process.

The term "hotmelt fibers" refers to synthetic fibers the polymers of which, in particular the fusible components, become soft but not sticky in the temperature range starting when the glass transition point (Tg) is reached up to the melting point. The meltable components do not become completely liquid (viscous) until the melting temperature is exceeded. The liquid (viscous) components preferably accumulate at fiber crossing points and stick together after cooling. So-called bonding points are formed. Hotmelt fibers can be used as homocomponent but also as bicomponent fibers. These fibers have a fiber fineness of between 4.4 and 7.7 dtex, with a fiber titer range of 4.4-5.4 dtex being preferred to ensure the bonding effect. Until the melting point of the polymers used is reached, such fibers have no adhesive properties. For example, a bicomponent core/sheath hotmelt adhesive fiber can be used. For example, the fiber core can be formed from a polyethylene terephthalate with a melting point of 256° C., and the fiber cladding from a co-polyethylene terephthalate with a melting point of 110° C.

The term adhesive fibers describes synthetic homopolymeric staple fibers which have predominantly amorphous, not yet crystallized components. In contrast to the aforementioned hotmelt adhesive fibers, adhesive fibers are tacky and deformable in the temperature range from the glass transition point to the melting of the polymer.

According to the invention, adhesive fibers with a fiber fineness of between 4.4 and 17.0 dtex are used, wherein a fiber titer range of 4.4-11.0 dtex is preferred and more preferably a range of 5.4-9.0 dtex is used to ensure the acoustic effect and to ensure component rigidity. When subjected to compressive stress above the glass transition temperature, adhesive fibers can be plastically deformed. Furthermore, by applying pressure/calendering above that of the Tg, adhesive fibers can adhere to themselves or to other fibers.

With the first heat treatment, an irreversible, slowly progressing crystallization process is initiated. After completion of the crystallization process, the bonds or deformation created are stable even above the glass temperature.

As already mentioned at the beginning, a molded part must be dimensionally stable, flexurally rigid and sound-absorbing.

The prior art assumes the use of fiber blends with a low medium fiber titer in the range of less than 3.0 dtex. The matrix fibers normally used have a titer of 2.2 dtex or less. This ensures sound attenuation, but does not provide rigidity in a molded part. See also Table 1.

In this respect, the present invention differs from the prior art.

These advantages of a molded part according to the invention compared to the prior art are due to the use of adhesive fibers and their higher fiber diameter. Although fewer fibers are present in the compound, the higher fiber diameter of the adhesive fibers makes more adhesive mass available. This adhesive mass is then offered to the molded part as a stiffening mass during pressure and heat treatment, so that the flexurally rigid properties of a molded part made according to the invention are significantly higher than those of the prior art.

The use of adhesive fiber with a fiber titer greater than 4.4 dtex is characteristic. In order to ensure the combination of sound absorption and component rigidity, according to the invention a nonwoven fabric is produced as the base material which has a proportion of 40-80 wt % adhesive fiber in a titer range of 4.4 to 17.0 dtex, 60-0 wt % hotmelt adhesive fibers in a titer range of 4.4 to 7.0 dtex and 60-10 wt % matrix fibers in a titer range of 1.7 to 3.3 dtex.

The medium fiber fineness of a fiber blend according to the invention must be greater than 4.4 dtex. This is to ensure the component rigidity.

Molded parts according to the invention can be made, for example, as follows and without being limited thereto:

Manufacture of a fiber blend from
- thermoplastic staple fibers
- bicomponent staple fibers
- thermoplastic adhesive fibers.

Mananufacture of a fiber pile from the fiber blend by means of a web former, e.g. carding and crosslapping or aerodynamic web formation.

Setting the desired weight per unit area.

Consolidation of the fiber pile into a base material by means of a mechanical consolidation unit, e.g., by means of needling and adjustment of the thickness of the base material.

Winding of the base material by means of a winder.

Laying-up a press tool for high temperatures (200° C.-220° C.) (die and patrix).

Preparation and preheating of the press tool (surface tempering/demolding).

Insertion of one or more layers of the base material into the hot mold, resulting in a molded blank.

Pressing and heating the layers of the molded blank in one step.

Demolding of the hot molded part from the hot mold.

Cooling of the molded part.

Finishing of the molded part (trimming of edges, protrusions, . . . ).

The present invention is based on the relationship between the thickness of the base material and the degree of pressing in the pressing tool and the use of adhesive fibers.

When the base material is subjected to pressure and heat treatment above the glass transition temperature of the adhesive fiber, the adhesive fibers become soft, plastically deformable and tacky. Due to the pressure, the matrix fibers are pressed into the soft adhesive fiber mass and initially remain stuck. After cooling, the matrix fibers are attached or bonded to the adhesive fiber mass. Furthermore, it can be deduced from the prior art that a phase transition of the amorphous areas of the adhesive fiber mass into crystalline areas takes place during heat and pressure treatment. As a result, the adhesive fibers no longer exhibit adhesive properties under pressure and heat treatment, but are now present in the molded part as a matrix fiber stiffening component.

For a given thickness and density of the molded blank, the resulting molded part after heating/pressing/cooling can have the following properties due to the distances between the die-to-patrix surfaces of the press tool:

The distance from die to patrix is equal to the thickness of the molded blank or is less by 10% at the most:

The molded part has insufficient flexural rigidity, and the specific flow resistance is so low that sound is not attenuated.

The pressing degree is between 0-10%.

The distance from die to patrix corresponds to between 90-60% of the thickness of the molded blank.

Compared to the unpressed state, the molded part has a higher dimensional stability, expressed by the flexural rigidity. Due to the increased proportion of surface flattening (1), the specific flow resistance is in the range of 1000-1500 Pa s/m.

The degree of flattening is in the range of 25-50%.

The pressing degree is between 10-40%.

The distance from die to patrix corresponds to between 60-25% of the thickness of the molded blank.

This pressing degree is preferred in the meaning of the invention. Compared with the unpressed state, a molded part manufactured in this way has significantly greater dimensional stability, expressed by the flexural rigidity. The higher degree of pressing increases the proportion of surface flattening (1).

The specific flow resistance is in the range of 1500-3000 Pa s/m.

The flattening degree is in the range of 50-75%.

The pressing degree is between 40-75%.

The distance from die to patrix is less than 25% of the thickness of the molded blank.

The molded part has a very high flexural rigidity compared to the unpressed moldet blank.

The adhesive fiber portions are flat-pressed in the middle layer together with the fiber matrix, and at the surface there occurs an almost complete scaling and compaction. The flow resistance increases rapidly due to the high compaction of the porous structure. The sound wave impinging on the molded part can no longer penetrate and is reflected. The molded part no longer has a sound-absorbing effect.

However, due to the scaling, the molded part is tight against liquid impact and also impact resistant.

The pressing degree is greater than 75%.

The flattening degree is >75%.

Within the pressing mold, zonally different distances from die to patrix can be selected. This means that the molded blank is compacted differently within a press mold. On the outside of the molded blank with the surfaces of the die and/or patrix of the heated press tool, there are contact surfaces on which flattenings (1) are formed by adhesive fibers according to the invention.

The flattenings (1) according to the invention have a favorable effect on sound attenuation, since they have a surface-enlarging effect on impinging sound waves beyond the degree of viscous friction known from the prior art and thus contribute to attenuating the intensity of the sound waves.

Figure 6:
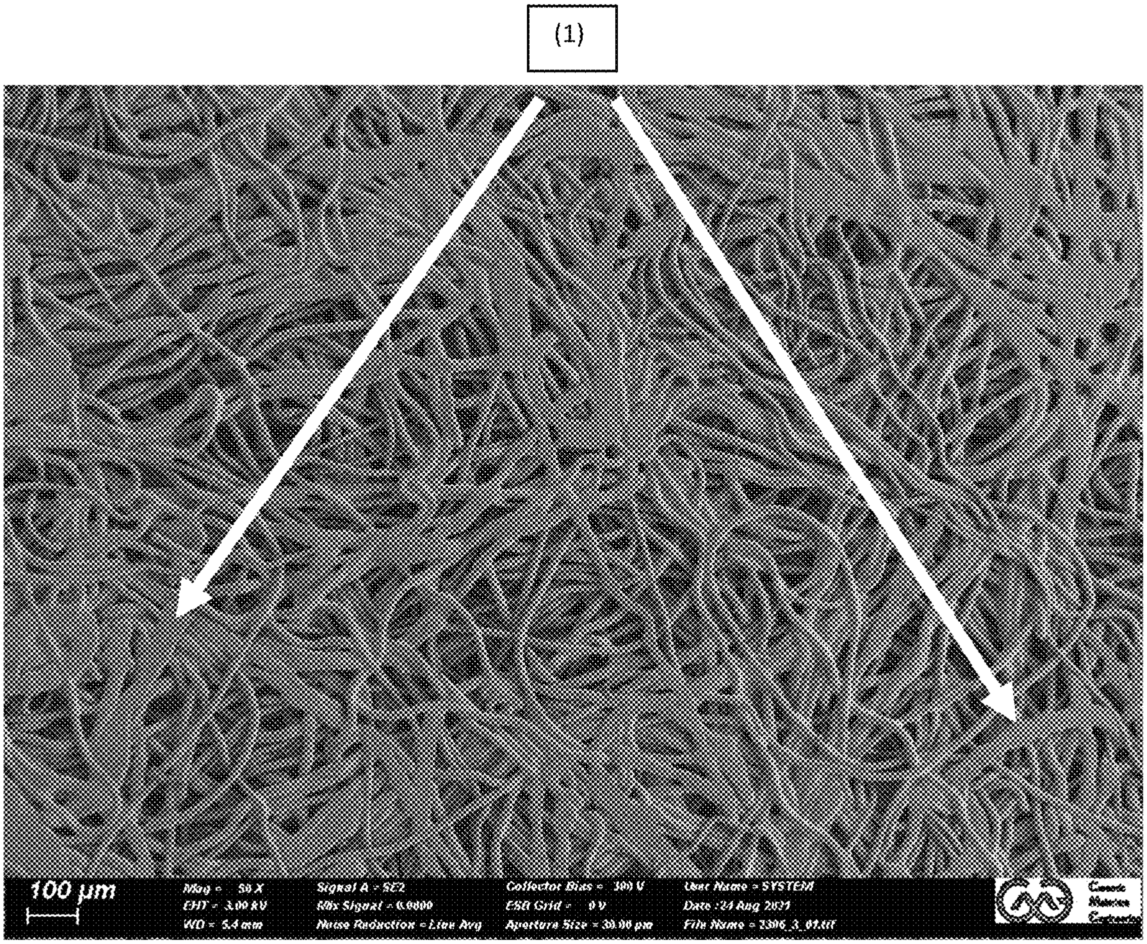
FIG. 6 shows the product 88FT220111 at the pressing degree was 39%.
Figure 7:
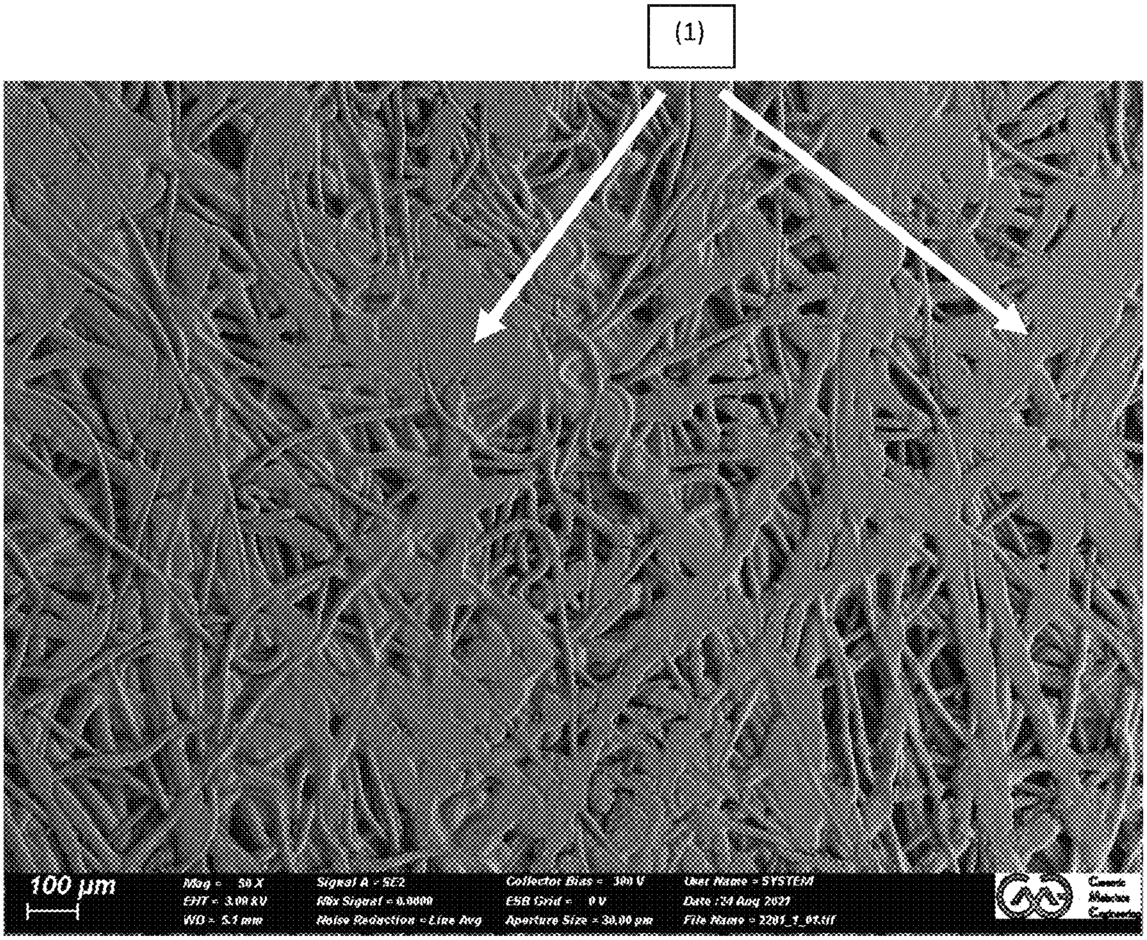
FIG. 7 shows the product 88FT220111 at the pressing degree was 63%.

A molded part according to the invention has flattened areas (1) on the outside. The thickness of the outside with flattenings (1) is determined by the fiber diameter of the adhesive fibers used and lies between 15 μm and 40 μm. FIGS. 6 and 7 show flattenings (1) according to the invention. The images were taken using a scanning electron microscope.

Figure 8:
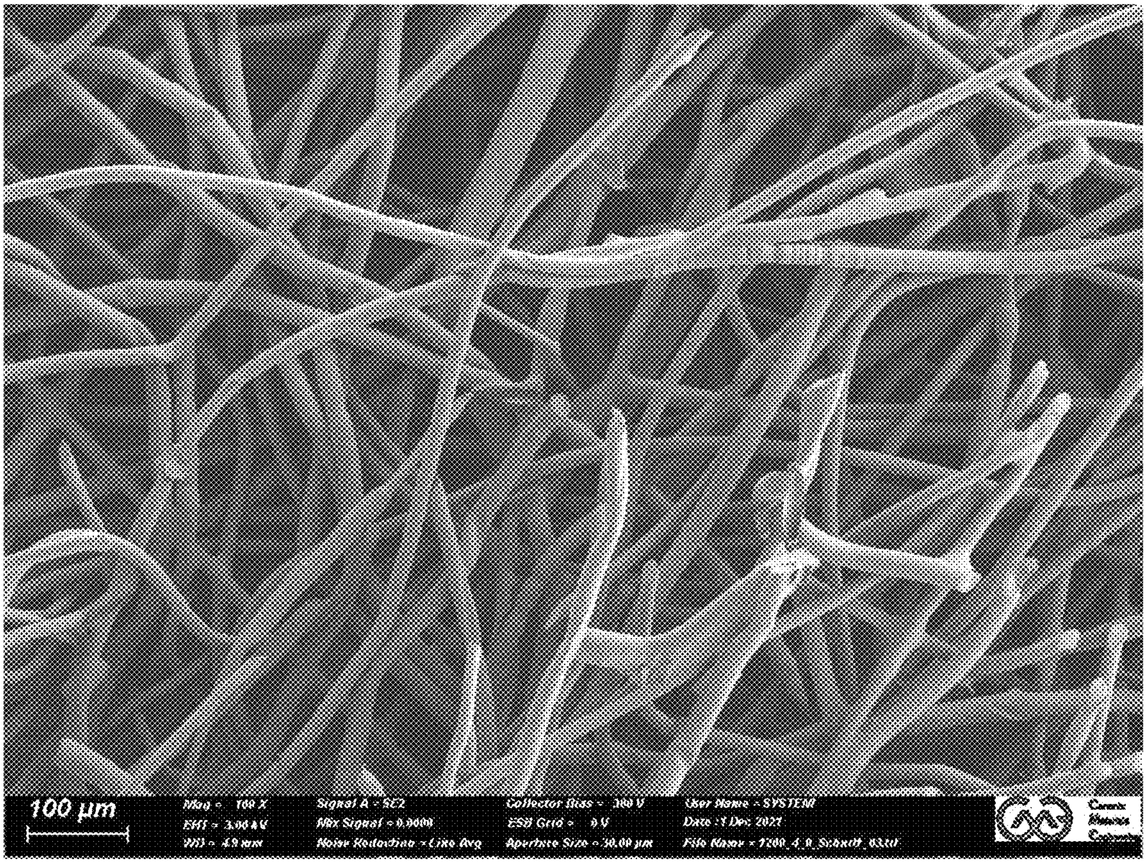
FIG. 8 shows an SEM image of a longitudinal section of the interior of a molded part according to this disclosure.

According to the invention, the middle layer of the molded part does not contain any flattenings (1) or fiber lumps formed by adhesive fibers. Adhesive fibers are deformed in the interior of the molded part only to the extent that they act as bonding points with themselves, with matrix fibers or hotmelt fibers. FIG. 8 shows an SEM image of a longitudinal section of the interior of a molded part according to the invention.

The flattenings (1) in FIGS. 6 and 7 are partially marked for illustration. In contrast, in FIG. 5, which shows the prior art product 32FT090104, flattenings are missing on the surface of the outer layer. Images 5 to 8 were taken using a scanning electron microscope.

Surprisingly, it was found that the use of adhesive fibers with fiber titers greater than 4 dtex to achieve the aforementioned flattenings (1) results in improved sound attenuation, which is accompanied by a flexural rigidity superior to that of the prior art. This is despite the fact that the porosity is similar to the prior art, see also Table 1. The combination of the flattenings (1) on the outside of a molded part according to the invention with the absence of lumps on the inside has a favorable effect on flow resistance.

Figure 5:
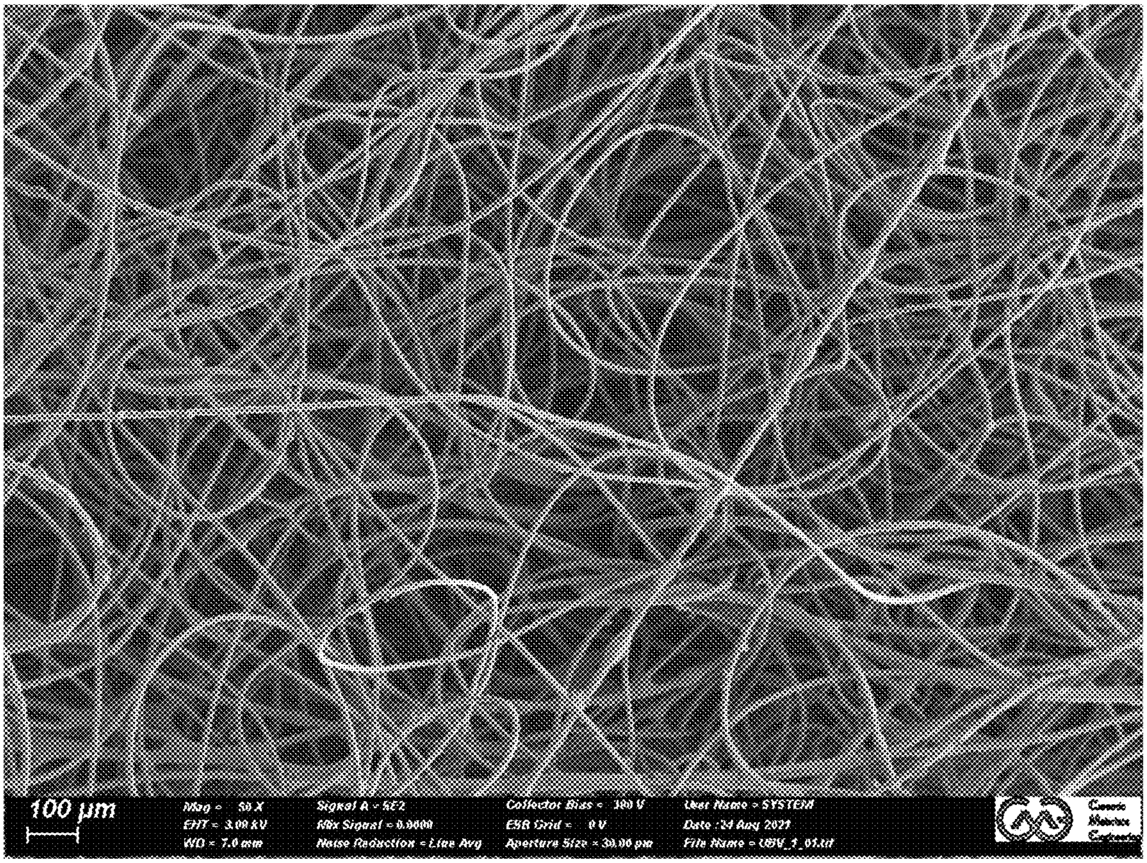
FIG. 5 shows the product 32FT090104, the composition of which can be taken from Table 1. Heat and pressure treatment as described above does not change the shape of the fibers used.

FIG. 5 shows the product 32FT090104, the composition of which can be taken from Table 1. Heat and pressure treatment as described above does not change the shape of the fibers used.

FIGS. 6 and 7 show the product 88FT220111 at different pressing degrees. For the manufacture of the product in FIG. 6, the pressing degree was 39%; for the manufacture of the product of FIG. 7, the pressing degree was 63%.

Using the method for determining the degree of flattening, the molded part in FIG. 6 has a flattening degree of 28%, while FIG. 7 has a flattening degree of 66%.

The proportion of flattenings on the surface depends on the degree of compaction of the base material.

A sound-absorbing molded part according to the invention must be configured in such a way that its sound-absorbing areas have a flattening degree of at least 30% and at most 75%.

The sound attenuation can be determined directly by measuring the sound absorption in accordance with DIN EN ISO 10534; indirectly, this can also be done by determining the specific flow resistance.

A molded part according to the invention may only be compressed to such an extent that, in order to ensure sound attenuation, the specific flow resistance is in the range 1000-3000 Pa s/m.

If the specific flow resistance is greater than 3000 Pa s/m, the impinging sound cannot penetrate sufficiently into the material, i.e. it is largely reflected.

If the specific flow resistance is less than 1000 Pa s/m, the sound penetrates the structure without causing viscous frictional losses (dissipation). Sound attenuation is not given.

Inside a molded part configured according to the invention, there are a plurality of bonding points for the adhesive fiber. The original fiber shape of the adhesive fibers is largely retained, the adhesive fiber serves as a stiffening component but also bonds with fibers present in the matrix. The amorphous polymer components of the adhesive fibers crystallize out in an uncontrolled manner after pressure and heat treatment, thereby improving the stiffness of a molded part configured according to the invention.

As shown in Table 1, the molded part 1 produced according to the invention exhibits significant differences in the fiber blend in terms of medium fiber fineness and fiber types compared to the prior art.

The medium fiber fineness of the base material for producing the manufactured molded part according to the invention is almost a factor of 2 higher compared to the prior art.

The specific flow resistance of the product 88FT220111, pressing degree 62%, produced according to the invention is 2200 Pa s/m, a material produced according to the prior art this is 1736 Pa s/m.

The component stiffness, expressed as flexural rigidity at 5 mm deformation travel, of the product 88FT220111 produced according to the invention is 8.50 N in the MD (longitudinal) direction and 10.14 N in the CD (transverse) direction; the material produced according to the prior art is 5.71 N in the MD direction and 5.97 N in the CD direction.

Figure 10:
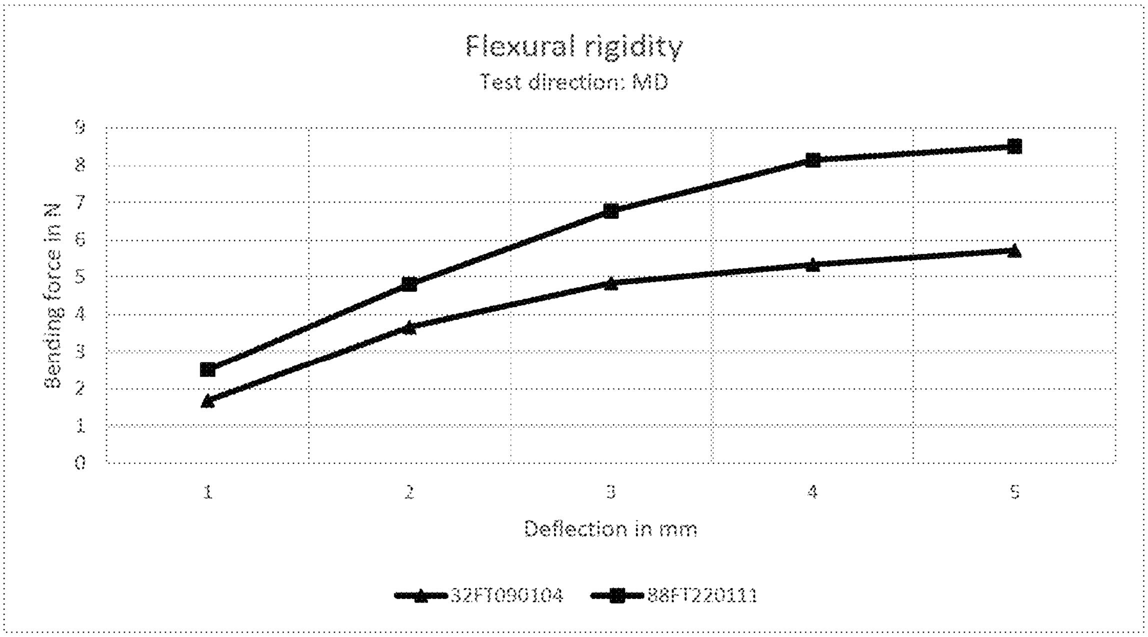
FIG. 10 shows flexural rigidity in a test direction MD for products 32FT090104 and 88FT220111.
Figure 11:
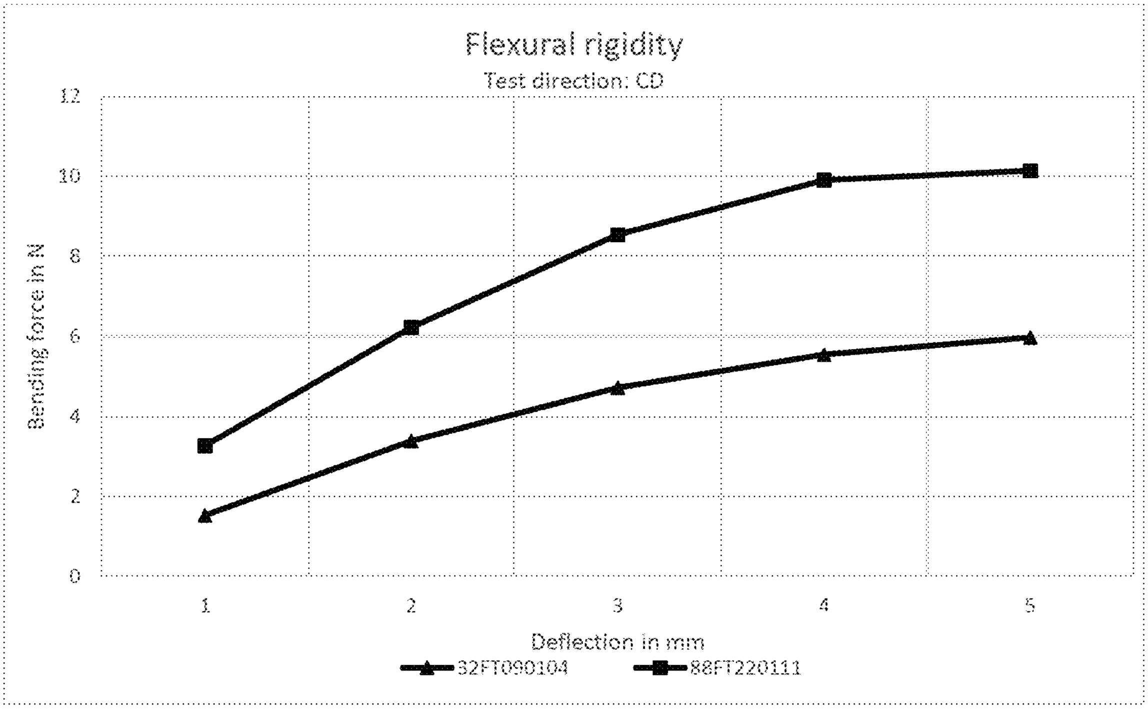
FIG. 11 shows flexural rigidity in a test direction CD for products 32FT090104 and 88FT220111.

FIGS. 10 and 11 illustrate this once again.

As shown in Table 2, the sound absorption of the product 88FT220111 produced according to the invention is higher than that of the prior art material at all the frequencies tested.

Figure 9:
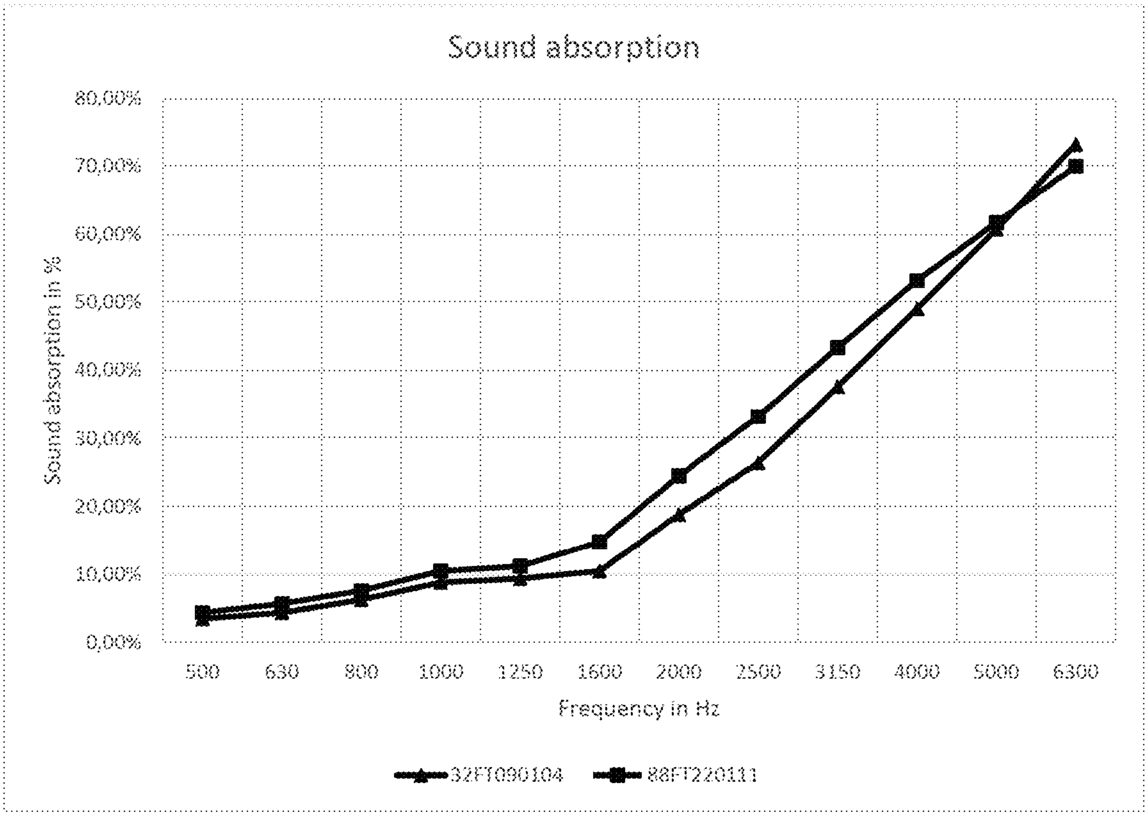
FIG. 9 shows a sound attenuation curve at a test direction MD for products 32FT090104 and 88FT220111.
Figure 9:
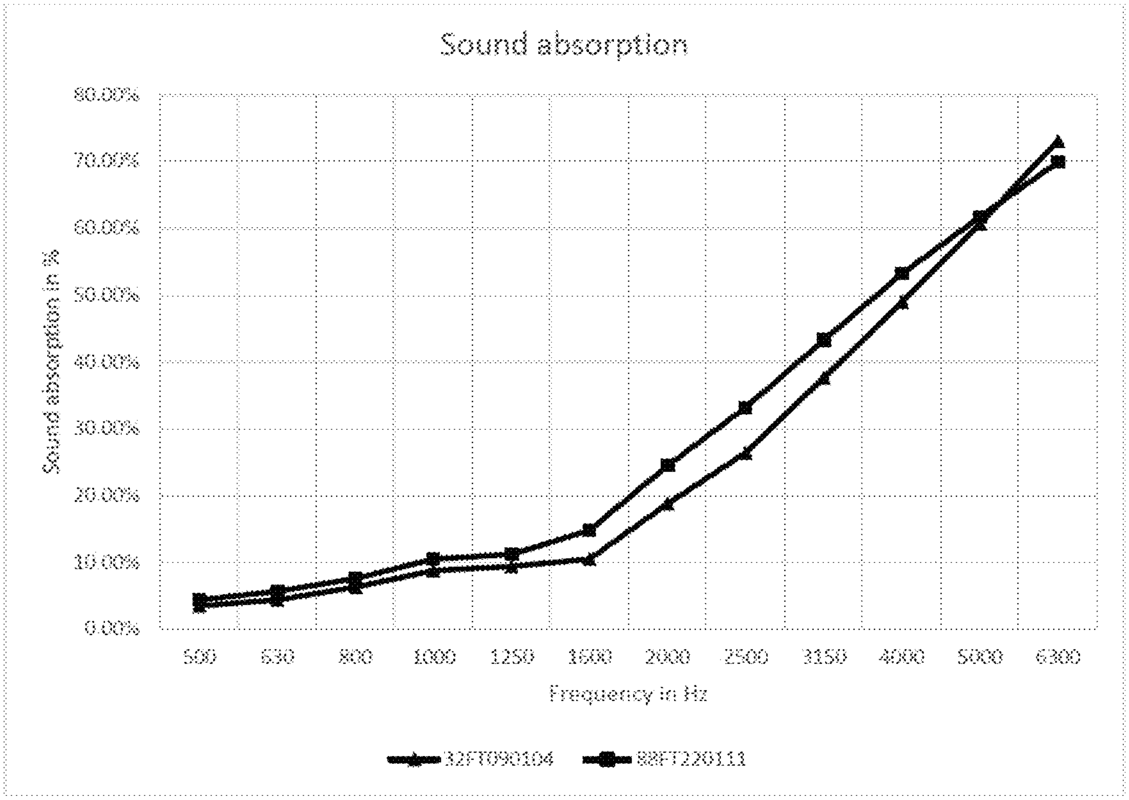

The sound attenuation curve shown in FIG. 9 illustrates this once again.

In addition, the flattenings (1) also ensure higher impact strength and, at a high degree of pressing, liquid tightness.

Depending on the shape of the pressing tool and zonal compaction, a resulting molded part can have areas that are sound-absorbing and shape-stabilizing or liquid-tight/impact-resistant.

A molded part manufactured according to the invention can therefore be used for a wide variety of end applications, depending on the compression degree in the pressing mold.

At a high pressing degree greater than 65%, for example, a molded part according to the invention can be liquid-tight and impact-resistant and can be used as a wheel arch liner.

At a medium pressing degree of 40-65%, a molded part according to the invention can be used, for example, as underbody paneling or also as a self-supporting headliner or for paneling A, B or C pillars in a motor vehicle.

The use of a uniform choice of polymers, e.g., based on polyethylene terephthalate, ensures that the material can be recycled.

TABLE 1

| Designation of the base material | Unit | Molded part 1 according to the invention 88 FT 22 01 11 | Molded part according to the prior art 32 FT 09 01 04 |
|---|---|---|---|
| Fiber blend: | | 20% hotmelt adhesive fibers CoPET/PET4.4dtex 60% adhesive fibers PET-amorphous, 7,0dtex 20% matrix fiber PET 3,3dtex | 50% hotmelt adhesive fibers CoPET/PET4.4dtex 50% matrix fibers PET 1.7dtex |
| Medium fiber fineness of the base material | g/10000 m | 5.21 | 2.45 |
| Medium fiber diameter | m | 0.000022 | 0.000015 |
| Medium density of the fiber material | $kg/m^3$ | 1380 | 1380 |
| Thickness of the base material before compression | mm | 10.8 | 10.6 |
| Specific fiber surface of the base material: | $m^2/g$ | 0.13 | 0.19 |
| FG | $kg/m^2$ | 1.348 | 1.328 |
| Thickness of the molding part | mm | 4.0 | 4.1 |
| Pressing degree | % | 63.0 | 61.3 |
| RG of the molding part: | $kg/m^3$ | 337 | 324 |
| Porosity of the molding part: | % | 76 | 77 |
| Specific flow resistance of the molding part: | Pa s/m | 2200 | 1736 |

TABLE 1-continued

| Flexural rigidity ( 3-point-bending test) of the molding part | N | MD | CD | MD | CD |
|---|---|---|---|---|---|
| Deformation travel 1 mm | | 2.50 | 3.26 | 1.67 | 1.52 |
| Deformation travel 2 mm | | 4.79 | 6.22 | 3.65 | 3.38 |
| Deformation travel 3 mm | | 6.77 | 8.54 | 4.83 | 4.71 |
| Deformation travel 4 mm | | 8.14 | 9.90 | 5.33 | 5.54 |
| Deformation travel 5 mm | | 8.50 | 10.14 | 5.71 | 5.97 |
| Flattening degree | % | 66 | | 0 | |

TABLE 2

| Impedance measurement-tube DIN EN ISO 10534-2 Round tube, Ø 29 mm Directly on sonic finish | | |
|---|---|---|
| Test frequency (Hz) | 32FT090104 | 88FT220111 |
| 500 | 3.50% | 4.40% |
| 630 | 4.40% | 5.70% |
| 800 | 6.30% | 7.60% |
| 1000 | 8.80% | 10.50% |
| 1250 | 9.40% | 11.20% |
| 1600 | 10.50% | 14.80% |
| 2000 | 18.80% | 24.50% |
| 2500 | 26.40% | 33.20% |
| 3150 | 37.60% | 43.30% |
| 4000 | 49.00% | 53.20% |
| 5000 | 60.70% | 61.70% |
| 6300 | 73.10% | 69.90% |

What is claimed is:

1. An acoustically effective molded part which is dimensionally stable after pressure and heat treatment, wherein the effective molded part consists of a mechanically solidified staple fiber nonwoven fabric formed from fibers that comprise;

thermoplastic staple fibers made of synthetic thermoplastic polymers formed from filaments which have been stretched and have crystalline regions;

bicomponent hotmelt adhesive fibers that are synthetic fibers having polymers that become soft but not sticky at temperatures ranging from a glass transition point (Tg) of the polymers to a melting point of the polymers; and thermoplastic adhesive fibers that are synthetic homopolymeric staple fibers having predominantly amorphous components;

wherein the effective molded part comprises an outer layer, a middle layer, and flattenings, wherein the flattenings are formed by the thermoplastic adhesive fibers, and the flattenings are located on the outer layer of the effective molded part;

wherein there are no flattenings in the middle layer of the effective molded part;

wherein the outer layer has a flattening degree of 25% to 75%, as determined by first determining how many flattened fibers are located in the outer layer of the molded part and then measuring the flattened fibers in relation to the area of the surface;

wherein the outer layer has a thickness of 15 μm to 40 μm; and wherein the effective molded part has a specific flow resistance in the range from 1000 to 3000 Pa s/m.

2. The effective molded part of claim 1, wherein the effective molded part is formed by fiber material consisting of a total of 100 wt % of:

greater 10 wt % and less than 60 wt % thermoplastic staple fibers;

up to 60 wt % bicomponent hotmelt adhesive fibers; and 80-40 wt % thermoplastic adhesive fibers.

3. The effective molded part of claim 1, wherein:

the thermoplastic staple fibers have a linear density of 1.7-3.3 dtex;

the bicomponent hotmelt adhesive fibers have a linear density of 4.4-7.7 dtex; and the thermoplastic adhesive fibers have a titer of 4.4-17 dtex.

4. The effective molded part of claim 1, wherein an average fiber diameter of a fiber blend forming the effective molded part is 3.5 to 11.1 dtex.

* * * * *